United States Patent
Park et al.

(10) Patent No.: US 7,450,200 B2
(45) Date of Patent: Nov. 11, 2008

(54) ARRAY SUBSTRATE FOR REFLECTIVE AND TRANSFLECTIVE LIQUID CRYSTAL DISPLAY DEVICES AND MANUFACTURING METHOD FOR THE SAME

(75) Inventors: June-Ho Park, Gyeongsangnam-do (KR); Jae-Sik Choi, Busan (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 11/004,857

(22) Filed: Dec. 7, 2004

(65) Prior Publication Data

US 2005/0078242 A1 Apr. 14, 2005

Related U.S. Application Data

(62) Division of application No. 10/028,759, filed on Dec. 28, 2001, now Pat. No. 6,833,883.

(30) Foreign Application Priority Data

Feb. 13, 2001 (KR) ................................. 2001-7097
Jun. 1, 2001 (KR) ............................... 2001-30699

(51) Int. Cl.
*G02F 1/1335* (2006.01)
*G02F 1/1333* (2006.01)

(52) U.S. Cl. ...................... 349/114; 349/122
(58) Field of Classification Search ................ 349/141, 349/143, 113–114, 122, 138
See application file for complete search history.

(56) References Cited

U.S. PATENT DOCUMENTS

| | | | |
|---|---|---|---|
| 6,157,426 A | 12/2000 | Gu | |
| 6,249,327 B1 * | 6/2001 | Murade et al. | 349/43 |
| 6,501,519 B2 | 12/2002 | Ha et al. | |
| 6,833,883 B2 * | 12/2004 | Park et al. | 349/43 |
| 6,839,108 B1 * | 1/2005 | Hirakata et al. | 349/114 |
| 6,927,820 B2 * | 8/2005 | Jang et al. | 349/114 |
| 2001/0022634 A1 | 9/2001 | Chung et al. | |
| 2002/0118322 A1 | 8/2002 | Murade | |

FOREIGN PATENT DOCUMENTS

| | | |
|---|---|---|
| JP | 11-312810 A | 11/1999 |
| KR | 2000-0062586 A | 10/2000 |

* cited by examiner

*Primary Examiner*—Dung T. Nguyen
(74) *Attorney, Agent, or Firm*—Birch, Stewart, Kolasch & Birch, LLP

(57) ABSTRACT

An array substrate for a reflective liquid crystal display device, including a gate line and a data line defining a pixel region by crossing each other; a switching element at a crossing portion of the gate line and the data line; a first passivation layer covering the switching element and the data line; and formed of an inorganic insulating material; a reflective electrode on the first passivation layer, and connected to the switching element; and a second passivation layer on the reflective electrode. The second passivation layer being formed of an organic insulating material.

23 Claims, 16 Drawing Sheets

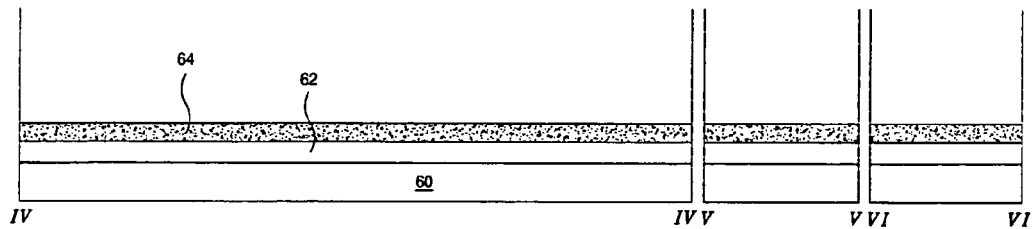
FIG. 7A
(CONVENTIONAL ART)
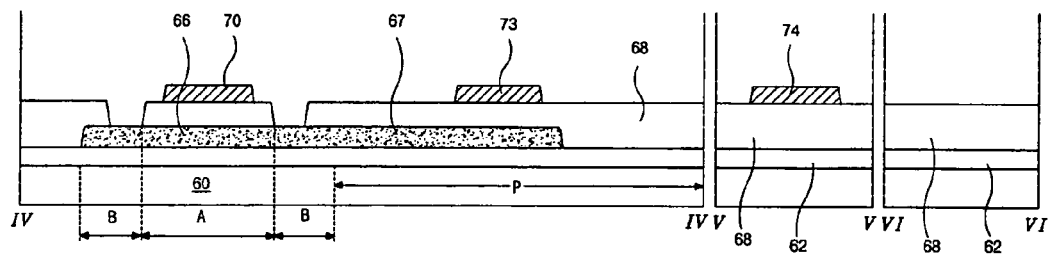
FIG. 7B
(CONVENTIONAL ART)
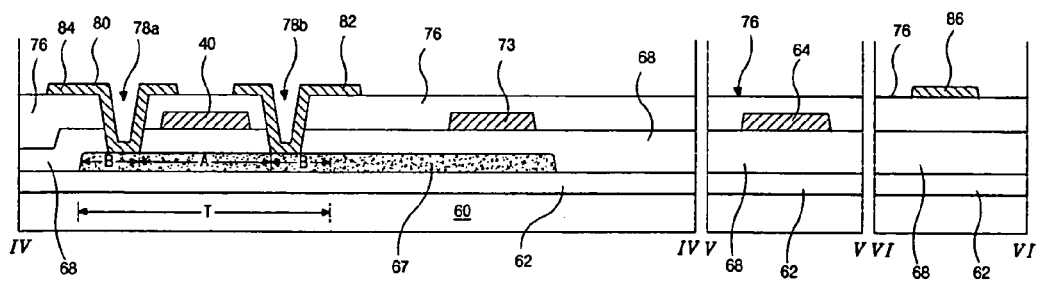

FIG. 7C
(CONVENTIONAL ART)
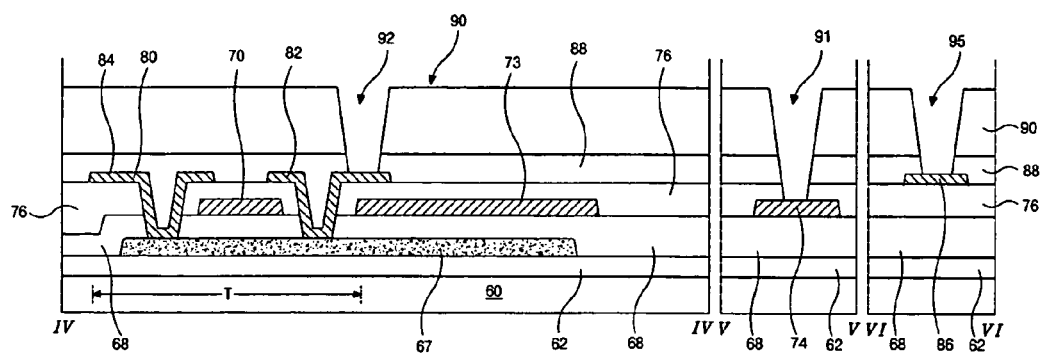
FIG. 7D
(CONVENTIONAL ART)
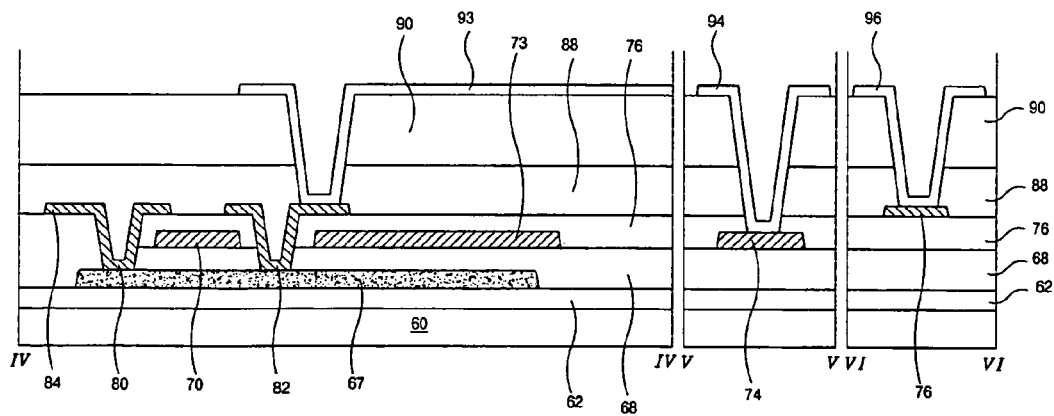
FIG. 7E
(CONVENTIONAL ART)

ARRAY SUBSTRATE FOR REFLECTIVE AND TRANSFLECTIVE LIQUID CRYSTAL DISPLAY DEVICES AND MANUFACTURING METHOD FOR THE SAME

This application is a Divisional of application Ser. No. 10/028,759, filed on Dec. 28, 2001, now U.S. Pat. No. 6,833,883, and for which priority is claimed under 35 U.S.C. § 120; and this application claims priority of Application No. 2001-7097 and 2001-30699 filed in Korea on Feb. 13, 2001 and Jun. 1, 2001, under 35 U.S.C. § 119; the entire contents of all are hereby incorporated by reference.

BACKGROUND OF THE INVENTION

1. Field of the Invention

The present invention relates to liquid crystal display devices, and more particularly, to an array substrate for reflective and transflective liquid crystal display devices.

2. Description of the Background Art

Generally, a reflective liquid crystal display device does not need to equip an additional light source such as a back light because it can substitute an external light source for the back light. A transflective liquid crystal display device has both properties of the reflective liquid crystal display device and a transmissive liquid crystal display device. Because the transflective liquid crystal display device utilizes both of the back light and the external light source, it can save power consumption.

FIG. 1 illustrates a liquid crystal panel for a conventional transflective liquid crystal display device. The conventional transflective liquid crystal display device 11 has an upper substrate 15 that includes a color filter 18 a transparent common electrode 13 and a lower substrate 21 that includes a pixel region "P", a pixel electrode 19, thin film transistor and an array of gate lines 25 and data lines 27. The color filter 18 includes a black matrix 16 and sub-color filters R, G and B. The pixel electrode 19 has a transmission portion "A" and a reflection portion "PR". Liquid crystal 23 is interposed between the upper substrate 15 and the lower substrate 21. The lower substrate 21 is also referred to as an array substrate with thin film transistors "T", switching elements, arranged in a matrix on the array substrate 21. A plurality of horizontal gate lines 25 and a plurality of vertical data lines 27 cross each other defining the pixel region "P". If the transparent pixel electrode 19 and the transmission portion "A" are omitted from the transflective liquid crystal display device, it becomes a reflective liquid crystal display device.

FIG. 2 is a plan view illustrating a partial array substrate for a conventional reflective liquid crystal display device. As shown in the figure, a plurality of gate lines 25 and a plurality of data lines 27 cross each other defining a pixel region "P". A thin film transistor "T" is formed at a crossing portion of the gate line 25 and the data line 27. The thin film transistor "T" usually includes a gate electrode 32, a source electrode 33, a drain electrode 35 and an active layer 34. A pixel electrode 19 is formed in the pixel region "P" and the thin film transistor "T" connected to the drain electrode 35 drives the liquid crystal 23 of FIG. 1. A reflective electrode, which is formed of opaque conductive metal having a high reflexibility, is substituted for the pixel electrode 19 in the reflective liquid crystal display device. The opaque conductive metal is selected from a group consisting of aluminum (Al) and aluminum alloys (AlNd, for example), for example.

Because the reflective liquid crystal display device uses an external light source, incident light from the external light source passes through the upper substrate (not shown) and is then reflected at the reflective electrode 10 on the array substrate 21. The reflected light subsequently passes through the liquid crystal and thereby polarization properties of the light are changed according to birefringence properties of the liquid crystal. Color images can be displayed when the light passing through the liquid crystal colors the color filter.

FIG. 3 is a cross-sectional view taken along III-III of FIG. 2 according to the conventional art. As shown in the figure, a gate electrode 32 and a gate line 25 of FIG. 2 are formed on a substrate 21. A gate insulating layer 41 is formed on the substrate 21 and on the gate electrode 32. An active layer 34 is formed on the gate insulating layer 41 and partially overlapped with a source electrode 33 and a drain electrode 35. The source electrode 33, the drain electrode 35 and the data line 27 are formed on the active layer 34. A thin film transistor includes the gate electrode 32, the source electrode 33, the drain electrode 35 and the active layer 34. A passivation layer 43 made of insulating material is formed on the thin film transistor. The passivation layer 43 is subsequently patterned to form a drain contact hole 45 exposing a part of the drain electrode 35. A reflective electrode 19 contacts the drain electrode 35 through the drain contact hole 45. The material for the reflective electrode 19 is selected from a group including aluminum (Al) and aluminum alloy (AlNd, for example), etc.

FIG. 5 is a cross-sectional view taken along line V-V of FIG. 4 according to the conventional art. A thin film transistor "T" including a gate electrode 32, a source electrode 33, a drain electrode 35 and an active layer 34 is formed and a first passivation layer 43 is formed on the thin film transistor "T". The first passivation layer 43 is formed by depositing a transparent organic insulating material such as benzocyclobutene (BCB) and acrylic resin. A drain contact hole 45 that exposes a part of the drain electrode 35 is formed and a etching hole 53 is formed by etching the first passivation layer 43 corresponding to the transmission hole 53 in the pixel region "P". A reflective electrode 19a that contacts the drain electrode 35 through the drain contact hole 45 is formed in the pixel region "P". The reflective electrode 19a is formed of aluminum (Al) and aluminum alloys (AlNd, for example), etc. A second passivation layer 47 is formed on the reflective electrode 19a and patterned to expose the reflective electrode 19a corresponding to the drain contact hole 45. The second passivation layer 47 is formed of insulating material such as silicon oxide ($SiO_2$) or silicon nitride ($SiN_x$), for example. A transparent pixel electrode 19b that contacts the exposed reflective electrode 19a through the patterned second passivation layer 47 is formed on the second passivation layer 47.

Several masks for patterning array elements of the array substrate are used in the manufacturing of the conventional reflective and transflective liquid crystal display device. An align key for accurate aligning of the mask and the substrate is formed on the corner of the substrate simultaneously with the gate line or the data line forming process. The shape of the align key has unevenness. Accordingly, a detector aligns the mask and the substrate by irradiating light onto the uneven surface of the align key and sensing the light reflected from the surface of the align key.

FIG. 6 is a plan view illustrating a partial array substrate having a coplanar type polysilicon thin film transistor for a conventional transflective liquid crystal display device. A gate line 71 and a data line 84 cross each other defining a pixel region "P" and a thin film transistor "T" is formed at a crossing portion of the gate line 71 and the data line 84. The thin film transistor "T" is a polysilicon thin film transistor that includes a polysilicon active layer and has a coplanar structure in which a gate electrode 70 is formed under a source electrode 80 and a drain electrode 82. A gate pad 74 and a data pad 86, which receive an external signal, are formed respectively at one end of the gate line 71 and the data line 84. The gate pad 74 and the data pad 86 respectively contact a gate pad terminal 94 and a data pad terminal 96 that are formed of transparent conductive material. The thin film transistor "T" includes the gate electrode 70, the source electrode 80, the drain electrode 82 and an active layer 66. The active layer 66 has an active layer expanded portion 67 in the pixel region "P". A storage line 72 is formed parallel to the gate line 71 with a same material as that of the gate line 71 and has a storage line expanded potion 73 in the pixel region "P". The pixel electrode 63 contacts the drain electrode 82. A storage capacitor portion "C" and a reflection portion "PR" are formed in the pixel region "P". A reflector 102 is formed on the storage capacitor portion "C". The rest potion of the pixel region "P" except the reflector 102 is a transmission portion "F".

FIGS. 7A to 7F are cross-sectional views taken along IV-IV, V-V, VI-VI of FIG. 6 illustrating a fabricating sequence of an array substrate according to the related art. In FIG. 7A, a first insulating layer 62 is formed on a substrate 60 by depositing inorganic insulating material such as silicon oxide ($SiO_2$) or silicon nitride ($SiN_X$) and an amorphous silicon layer 64 is formed on the first insulating layer by depositing amorphous silicon (a-Si:H). The first insulating layer 62, referred to as a buffer layer, is for preventing an expansion of alkaline substances from the substrate 60. The amorphous silicon layer 64 is crystallized into polysilicon by introducing a solid phase crystallization (SPC) method, a metal induced crystallization (MIC) method, a laser annealing method and a field effect metal induced crystallization (FEMIC) method.

In FIG. 7B, a semi-conductor layer 66 is formed by patterning the crystallized layer and a gate insulating layer 68, a second insulating layer, is formed on the semi-conductor layer 66. A conductive metal layer is subsequently formed on the gate insulating layer 68. A gate electrode 70 and a gate line 71 of FIG. 6 are formed by patterning the deposited conductive metal layer. The semi-conductor layer 66 has a semi-conductor layer expanded portion 67 in the pixel region "P". The gate pad 74 is formed at one end of the gate line 71. The storage line 72 is simultaneously formed parallel to the gate line 71 and the storage line 72 has the storage line expanded portion 73 on the pixel region "P".

The semi-conductor layer 66 can be divided into two regions, one is a first active region "A" and the other is a second active region "B". The first active region "A" is a pure silicon region and the second active region "B" is an impure silicon region. The second active regions "B" are positioned at both sides of the first active region "A". The gate insulating layer 68 and the gate electrode 70 are formed on the first active region "A". After forming of the gate electrode 70, ion doping is performed onto the second active region "B" to form a resistant contact layer. The gate electrode 70 serves as an ion stopper that prevents dopants from penetrating into the first active region "A". After the ion doping is finished, the semi-conductor layer 66, the polysilicon island, implements a specific electric characteristic, which varies with types of the dopants. If the dopant is, for example, $B_2H_6$ that includes a Group III element, a doped portion of the polysilicon island 66 becomes a p-type semiconductor. Whereas, if the dopant is $PH_3$ that includes a Group VI element, the doped portion of the polysilicon island 66 becomes an n-type semiconductor. A proper dopant should be selected to satisfy the use of a device. After the dopant is applied onto the polysilicon island 66, the dopant is activated.

In FIG. 7C, a third insulating layer 76, i.e, an interlayer insulator, is formed over the whole area of the substrate 60 and is patterned to form a source contact hole 78a and a drain contact hole 78b. A source electrode 80 and a drain electrode 82, which contact the second active region "B" through the source contact hole 78a and the drain contact hole 78b, respectively, are formed by depositing and then patterning conductive metals such as aluminum (Al), aluminum alloys, tungsten (W), copper (Cu), chromium (Cr) and molybdenum (Mo), etc. A data line 84 that contacts the source electrode 80 is simultaneously formed and a data pad 86 is formed at one end of the data line 84. The polysilicon thin film transistor "T" is formed through the above processes.

In FIG. 7D, a fourth insulating layer 88 is formed on the whole area of the substrate 60 and then the thin film transistor undergoes a hydrogenation process. The hydrogenation process is for removing defects that occurred on the surface of the active layer 66. A fifth insulating layer 90 is formed on the fourth insulating layer 88 using transparent organic insulating material such as benzocyclobutene (BCB) or acrylic resin. A first drain contact hole 92 exposing the drain electrode 82, a gate pad contact hole 91 exposing the gate pad 74 and a data pad contact hole 95 exposing the data pad 86 are formed by patterning simultaneously the laminated layers.

In FIG. 7E, a pixel electrode 93 that contacts the exposed drain electrode 82 and is extended to the pixel region, a gate pad terminal 94 that contacts the exposed gate pad and a data pad terminal 96 that contacts the exposed data pad are formed on the fifth insulating layer 90 using transparent conductive material such as indium tin oxide (ITO) or indium zinc oxide (IZO), for example.

In FIG. 7F, a sixth insulating layer 98 is formed on the whole area of the substrate 60 using silicon oxide ($SiO_2$) or silicon nitride ($SiN_X$), for example. A second drain contact hole 100 that exposes the pixel electrode 93 contacting the drain electrode 82 is formed by patterning the sixth insulating layer 98. A reflective electrode 102, which contacts the exposed pixel electrode 93, is formed on the sixth insulating layer 98 using conductive metal such as aluminum (Al) or aluminum alloys, for example. A first etching hole 104 that exposes the gate pad terminal 94 and a second etching hole 106 that exposes the data pad terminal 96 are formed by patterning the sixth insulating layer 98. The reason for exposing the gate pad terminal 94 and the data pad terminal 96 in the last process is to prevent the pixel electrode 93 and the reflective electrode 102 from being etched together in etching solution during an etching process for the reflective electrode 102.

Conventional reflective or transflective liquid crystal display devices have some problems described as follows. First, because a reflective electrode is formed on an organic insulating layer such as benzocyclobutene (BCB) and the contact property of the reflective electrode and the benzocyclobutene (BCB) layer is not good, the reflective electrode may not be stably deposited on the organic insulating layer. This lacks of stability lowers electric properties of a liquid crystal panel. Second, when a sputtering process is used for forming the reflective electrode on the benzocyclobutene (BCB), accelerated electrons collide into the surface of the benzocyclobutene (BCB) and separate the benzocyclobutene (BCB) particles from the surface, which produces benzocyclobutene (BCB) particles in a deposition chamber. The benzocyclobutene (BCB) particles in the deposition chamber contaminate the deposition chamber. Lastly, an align key may not be detected by a detecting apparatus if the benzocyclobutene (BCB) is deposited on the substrate and covers the align key.

Accordingly, alignment error of a mask and the substrate may be occurred during a light exposing process for patterning the reflective electrode.

SUMMARY OF THE INVENTION

Accordingly, the present invention is directed to an array substrate for reflective and transflective liquid crystal display devices and a manufacturing method of the array substrate for reflective and transflective liquid crystal display devices that substantially obviates one or more of problems due to limitations and disadvantages of the related art.

An object of the present invention is to provide an array substrate for a reflective liquid crystal display device, wherein a reflective electrode is not formed on organic insulating material such as benzocyclobutene (BCB), but formed on inorganic insulating material such as silicon nitride ($SiN_x$) to improve contact property of the reflective electrode and to prevent a deposition chamber from being contaminated with particles of the organic insulating material.

Another object of the present invention is to provide a manufacturing method of an array substrate for a reflective liquid crystal display device.

Another object of the present invention is to provide an array substrate for a transflective liquid crystal display device, wherein a reflective electrode is not formed on organic insulating material such as benzocyclobutene (BCB), but formed on inorganic insulating material such as silicon nitride ($SiN_x$) to improve contact property of the reflective electrode and to prevent a deposition chamber from being contaminated with particles of the organic insulating material.

Another object of the present invention is to provide a manufacturing method of an array substrate for a transflective liquid crystal display device.

Another object of the present invention is to provide an array substrate for a transflective liquid crystal display device having a barrier layer between an organic insulating layer and a reflector to improve contact property of the reflective electrode and to prevent a deposition chamber from being contaminated with particles of the organic insulating material.

Another object of the present invention is to provide a manufacturing method of an array substrate for a transflective liquid crystal display device having a barrier layer between an organic insulating layer and a reflector.

To achieve these and other advantages, one embodiment of the present invention, an array substrate for a reflective liquid crystal display device includes a gate line and a data line defining a pixel region by crossing each other, a switching element at a crossing portion of the gate line and the data line, a first passivation layer covering the switching element and the data line, the first passivation layer being formed of inorganic insulating material, a reflective electrode on the first passivation layer, the reflective electrode being connected to the switching element, and a second passivation layer on the reflective electrode, the second passivation layer being formed of organic insulating material. The reflective electrode is formed of conductive metal material such as aluminum (Al) or aluminum alloys, for example. The switching element is a thin film transistor including a gate electrode, a source electrode, a drain electrode and an active layer. The first passivation layer is desirably formed of silicon nitride ($SiN_x$). The second passivation layer is formed of organic insulating material such as benzocyclobutene (BCB) or acrylic resin, for example.

In another aspect, a preferred embodiment of a manufacturing method of an array substrate for a reflective liquid crystal display device includes the steps of forming a gate line and a data line that define a pixel region by crossing each other; forming a switching element at a crossing portion of the gate line and the data line; forming a first passivation layer covering the switching element and the data line; the first passivation layer being formed of inorganic insulating material; forming a reflective electrode on the first passivation layer, the reflective electrode being connected to the switching element; and, forming a second passivation layer on the reflective electrode. The second passivation layer being formed of organic insulating material.

The reflective electrode may be formed of conductive metal material such as aluminum (Al) or aluminum alloys, for example. The switching element is a thin film transistor including a gate electrode, a source electrode, a drain electrode and an active layer. The first passivation layer is preferably formed of silicon nitride ($SiN_x$). The second passivation layer is formed of organic insulating material such as benzocyclobutene (BCB) or acrylic resin, for example.

In another embodiment, an array substrate for a transflective liquid crystal display device includes a gate line and a data line defining a pixel region by crossing each other; a switching element at a crossing portion of the gate line and the data line; a first passivation layer covering the switching element and the data line and being formed of inorganic insulating material; a reflective electrode on the first passivation layer, connected to the switching element and including a transmission hole; a second passivation layer on the reflective electrode, formed of organic insulating material and patterned to expose a part of the switching element; and a transparent pixel electrode on the second passivation layer, formed in the pixel region and contacting the exposed part of the switching element.

The reflective electrode is formed of conductive metal material such as aluminum (Al) or aluminum alloys, for example. The switching element is a thin film transistor including a gate electrode, a source electrode, a drain electrode and an active layer. The first passivation layer is desirably formed of silicon nitride ($SiN_x$). The second passivation layer is formed of organic insulating material such as benzocyclobutene (BCB) or acrylic resin, for example.

In another embodiment, a manufacturing method of an array substrate for a transflective liquid crystal display device includes the steps of forming a gate line and a data line defining a pixel region by crossing each other; forming a switching element at a crossing portion of the gate line and the data line; forming a first passivation layer covering the switching element and the data line, the first passivation layer being formed of inorganic insulating material; forming a reflective electrode on the first passivation layer, the reflective electrode being connected to the switching element and including a transmission hole; forming a second passivation layer on the reflective electrode, the second passivation layer being formed of organic insulating material and patterned to expose a part of the switching element; and forming a transparent pixel electrode on the second passivation layer. The pixel electrode being formed in the pixel region and contacting the exposed part of the switching element. The reflective electrode is formed of conductive metal material such as aluminum (Al) or aluminum alloys, for example. The switching element is a thin film transistor including a gate electrode, a source electrode, a drain electrode and an active layer. The first passivation layer is desirably formed of silicon nitride ($SiN_x$). The second passivation layer is formed of organic insulating material such as benzocyclobutene (BCB) or acrylic resin, for example.

In another embodiment, an array substrate for a transflective liquid crystal display device includes a thin film transistor including an active layer a gate electrode and source and drain electrodes, being formed on a substrate in sequence; a gate line including a gate pad at one end of it, the gate line being connected to the gate electrode; a storage line being formed parallel to the gate line and being spaced apart from the gate line; a data line defining a pixel region by crossing the gate line, including a data pad at one end of it and being connected to the source electrode; an organic insulating layer over the thin film transistor and the data line; a barrier layer on the organic insulating layer and formed of inorganic insulating material; a reflector on the barrier layer, and a transparent pixel electrode on an inorganic insulating layer. The pixel electrode contacting the drain electrode, and the inorganic insulating layer being formed between the reflector and the pixel electrode. The array substrate for a transflective liquid crystal display device may further include a buffer layer beneath the active layer using inorganic insulating material such as silicon oxide ($SiO_2$) or silicon nitride ($SiN_x$), for example. The active layer is formed of polysilicon. The storage line is desirably formed with a same material as that of the gate line on a same layer as that of the gate line. The reflector is formed of conductive metal material such as aluminum (Al) or aluminum alloys, for example. The pixel electrode is formed of transparent conductive material such as indium tin oxide (ITO) or indium zinc oxide (IZO), for example. The reflector may desirably be extended to the data line and simultaneously cover the thin film transistor. The reflector may be partially overlapped with the gate line and the gate line. The barrier layer is formed using inorganic insulating material such as silicon oxide ($SiO_2$) or silicon nitride ($SiN_x$), for example. The array substrate further may include an insulating layer beneath the organic insulating layer to perform a hydrogenation process of the thin film transistor. The barrier layer is desirably formed of silicon nitride ($SiN_x$).

In another embodiment, a manufacturing method of an array substrate for a transflective liquid crystal display device includes the steps of forming a thin film transistor including an active layer, a first insulating layer, a gate electrode, a second insulating layer being formed on a substrate in sequence; forming a gate line and a storage line such that, the gate line includes a gate pad at one end of it and being connected to the gate electrode; and the storage line is formed parallel to the gate line and spaced apart from the gate line; forming a data line defining a pixel region by crossing the gate line including a data pad at one end of it and being connected to the source electrode, forming a third insulating layer over the thin film transistor and the data line, the third insulating layer being formed of transparent organic insulating material; forming a fourth insulating layer on the third insulating layer, the third insulating layer being a barrier layer and being formed of inorganic insulating material; forming a reflector on the barrier layer; forming a drain contact hole over the drain electrode by depositing and patterning a fifth insulating layer on the reflector; and forming a transparent pixel electrode on an inorganic insulating layer, the pixel electrode contacting the drain electrode. The inorganic insulating layer being formed between the reflector and the pixel electrode. The array substrate for a transflective liquid crystal display device may further include a buffer layer beneath the active layer using inorganic insulating material such as silicon oxide ($SiO_2$) or silicon nitride ($SiN_x$), for example. The active layer is formed of polysilicon. The storage line is desirably formed with a same material as that of the gate line on a same layer as that of the gate line. The reflector is formed of conductive metal material such as aluminum (Al) or aluminum alloys, for example. The pixel electrode is formed of transparent conductive material such as indium tin oxide (ITO) or indium zinc oxide (IZO). The reflector may desirably be extended to the data line and cover the thin film transistor. The reflector may be partially overlapped with the gate line and the gate line. The barrier layer is formed using inorganic insulating material such as silicon oxide ($SiO_2$) or silicon nitride ($SiN_x$), for example. The manufacturing method of the array substrate according to the present invention further includes forming an insulating layer beneath the organic insulating layer to perform a hydrogenation process of the thin film transistor. The barrier layer is desirably formed of silicon nitride ($SiN_x$).

These and other objects of the present application will become more readily apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention and wherein:

FIGS. 7A to 7F are cross-sectional views taken along lines IV-IV, V-V, VI-VI of FIG. 6 illustrating a fabricating sequence of an array substrate according to the conventional art;

DETAILED DESCRIPTION OF THE PREFERRED EMBODIMENTS

Reference will now be made in detail to the preferred embodiment of the present invention, which is illustrated in the accompanying drawings.

Figure 1:
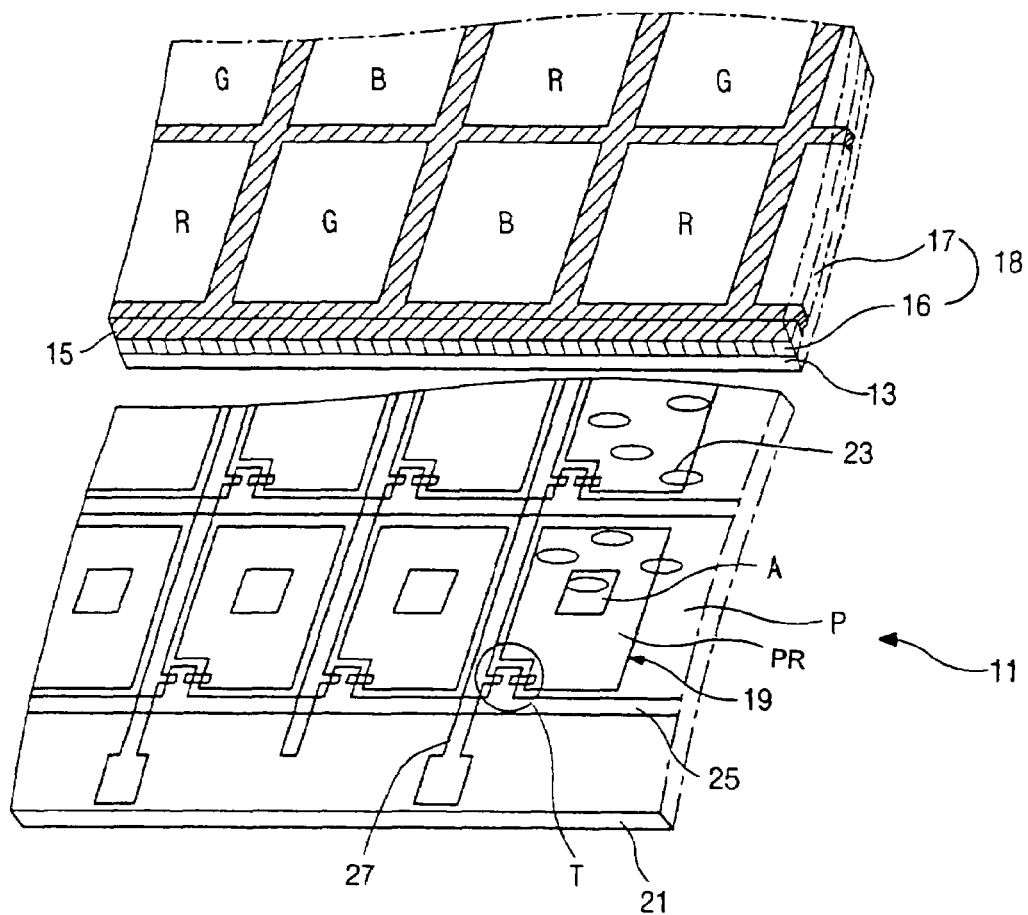
FIG. 1 is an exploded perspective view illustrating a liquid crystal panel for a conventional transflective liquid crystal display device.
Figure 2:
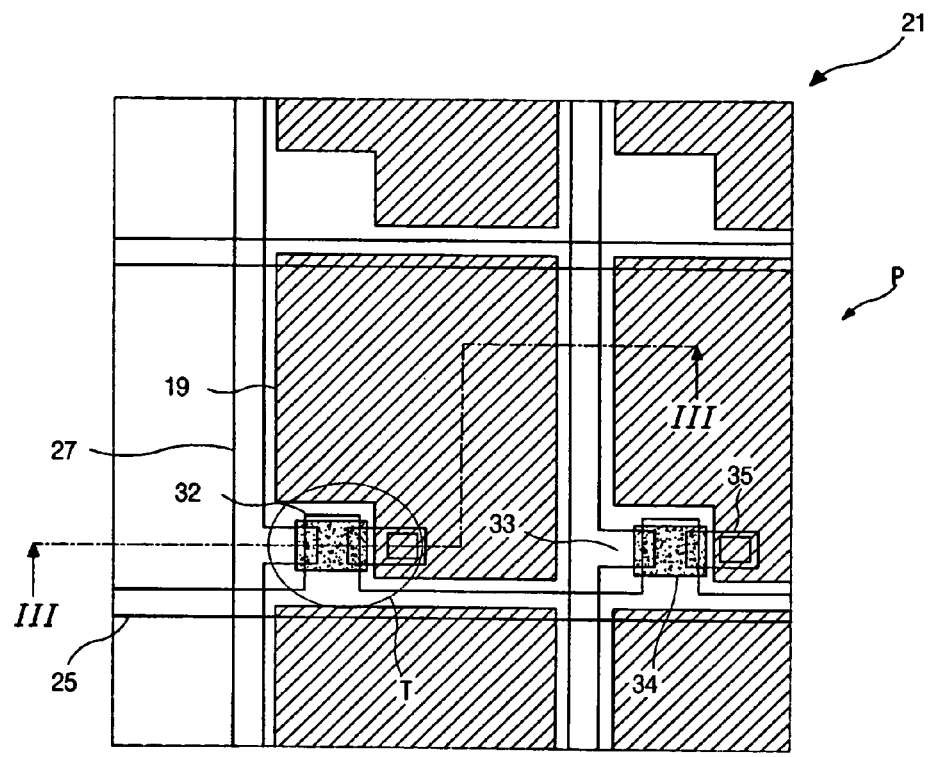
FIG. 2 is a plan view illustrating a partial array substrate for a conventional reflective liquid crystal display device.
Figure 3:
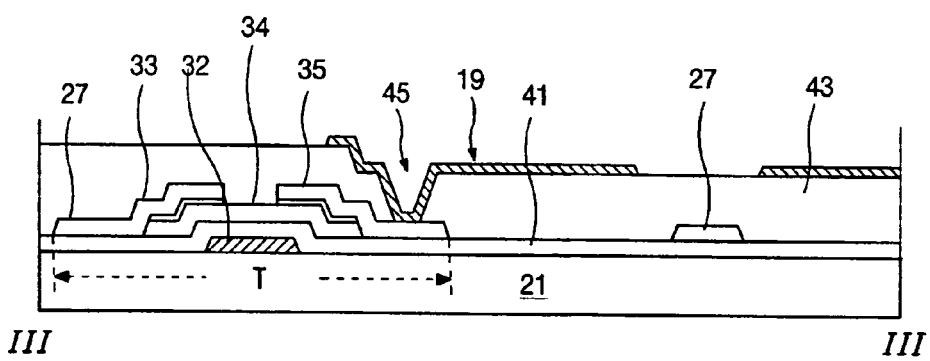
FIG. 3 is a cross-sectional view taken along line III-III of FIG. 2 according to the conventional art.
Figure 4:
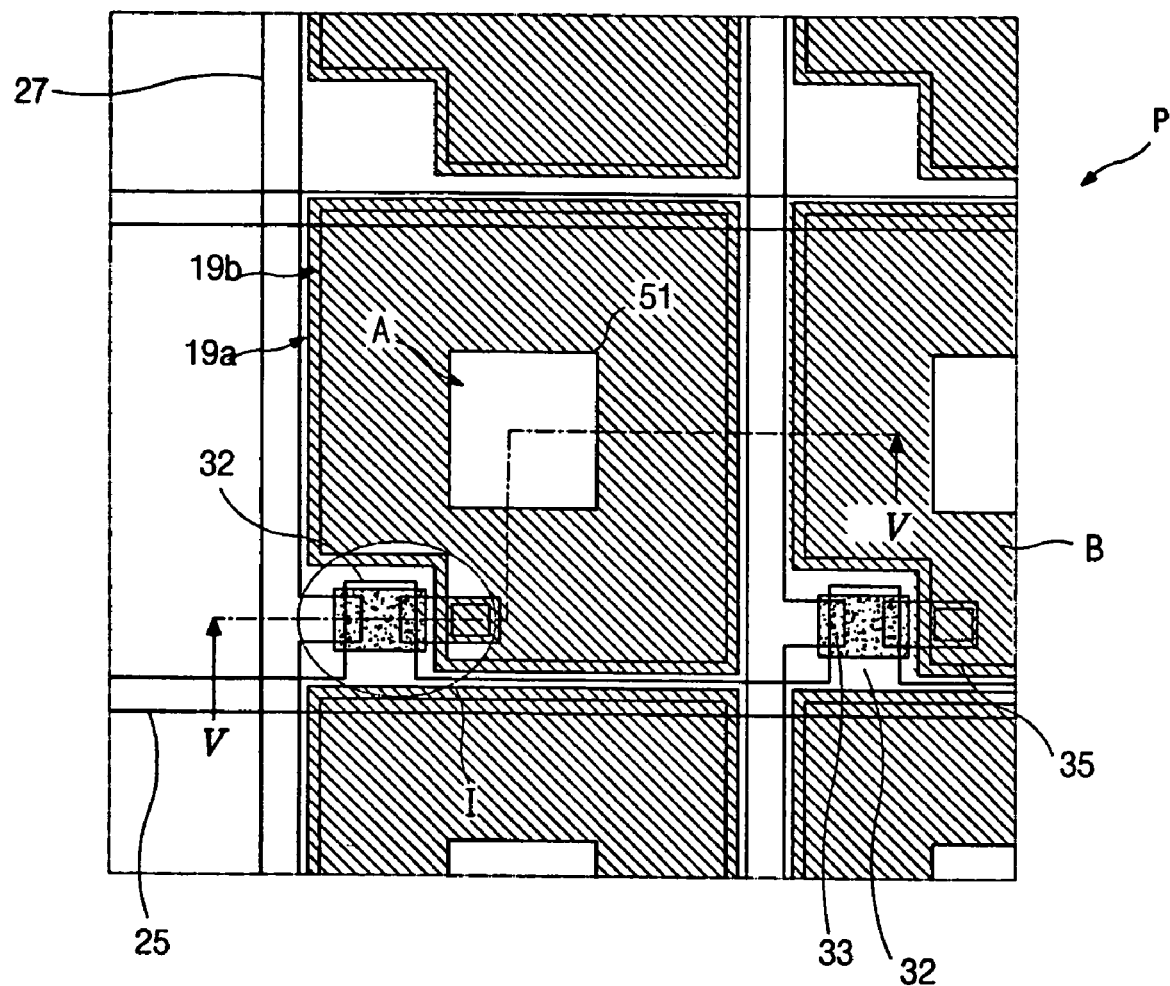
FIG. 4 is a plan view illustrating a partial array substrate having an inverted stagger type thin film transistor for a conventional transflective liquid crystal display device.
Figure 5:
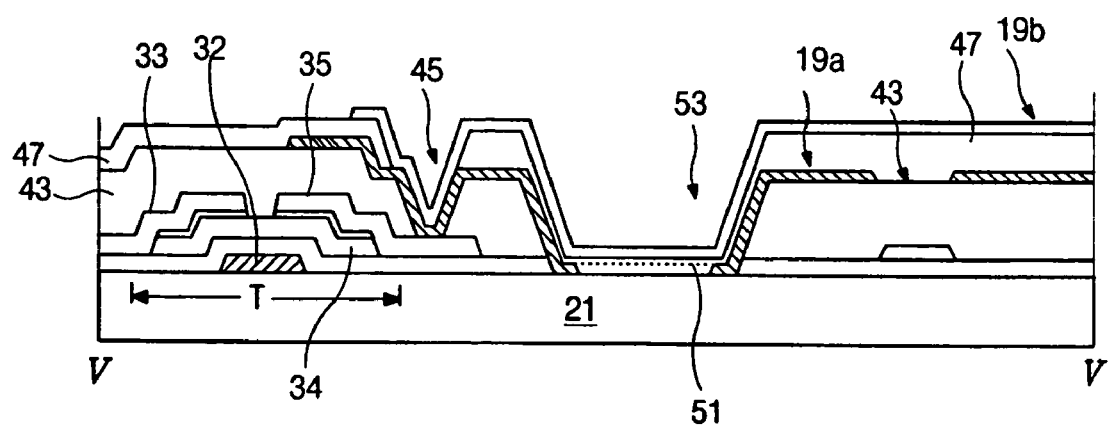
FIG. 5 is a cross-sectional view taken along line V-V of FIG. 4 according to the conventional art.
Figure 6:
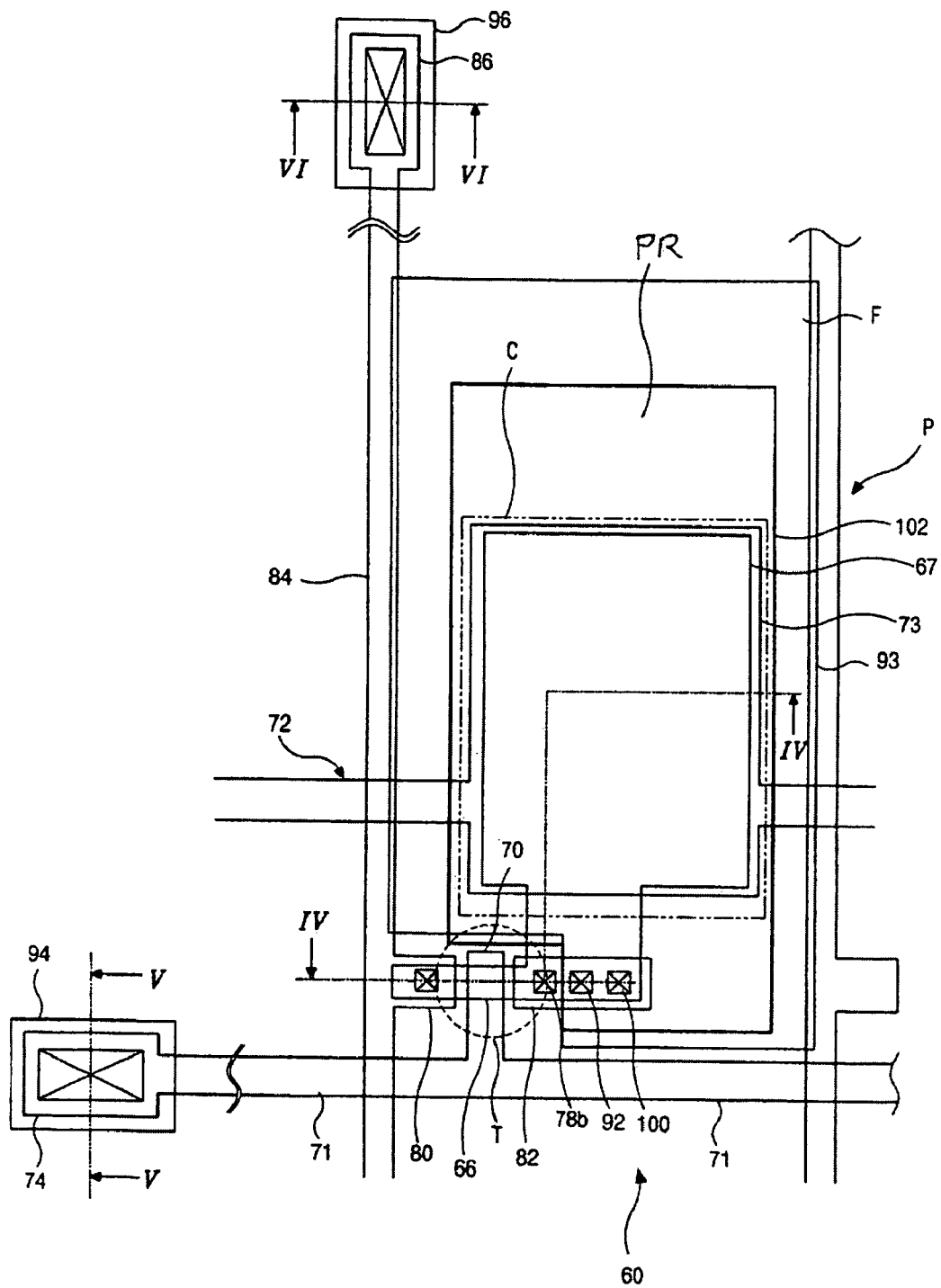
FIG. 6 is a plan view illustrating a partial array substrate having a coplanar type polysilicon thin film transistor for a conventional transflective liquid crystal display device.
Figure 7F:
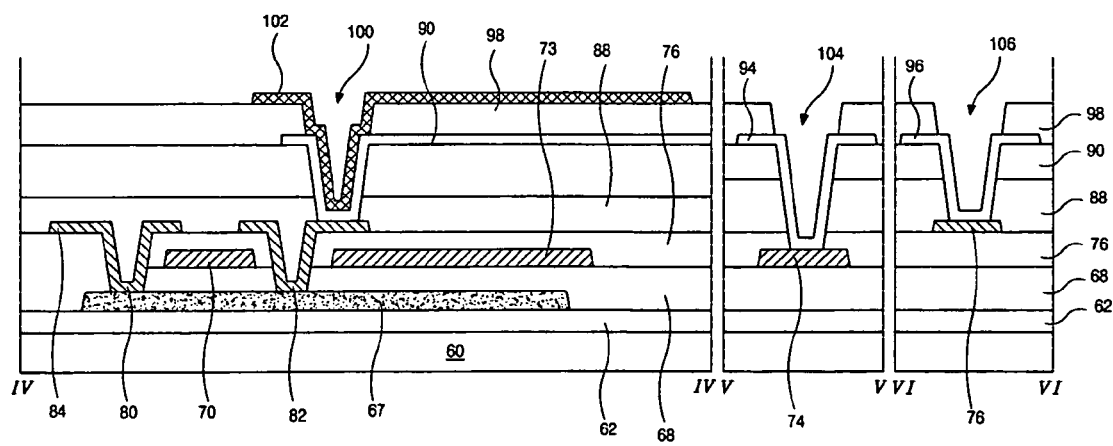
Figure 8:
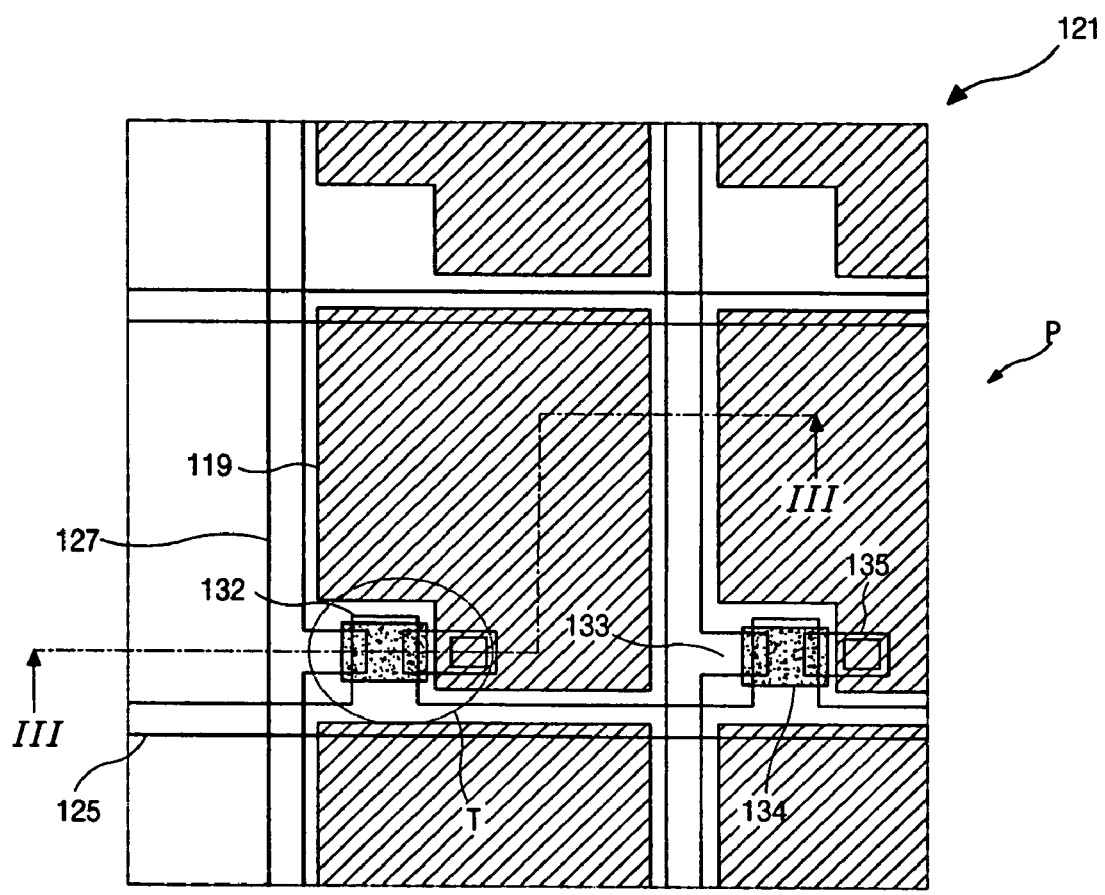
FIG. 8 is a plan view illustrating a partial array substrate for a reflective liquid crystal display device according to a first embodiment of the present invention.
Figure 9A:
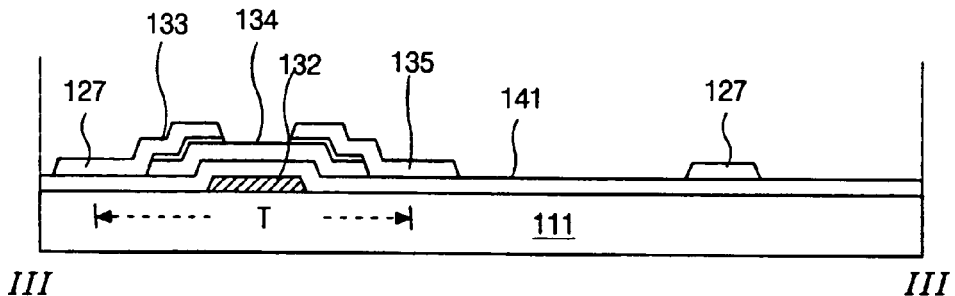
FIGS. 9A to 9C are cross-sectional views taken along III-III of FIG. 8 illustrating a method of manufacturing an array substrate according to the first embodiment of the present invention.
Figure 9B:
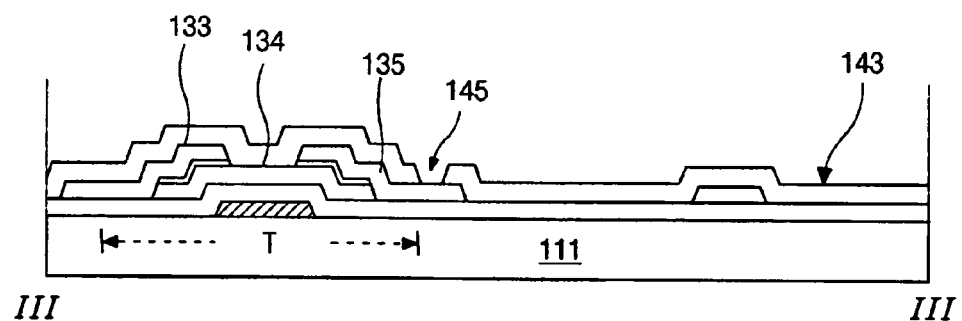
Figure 9C:
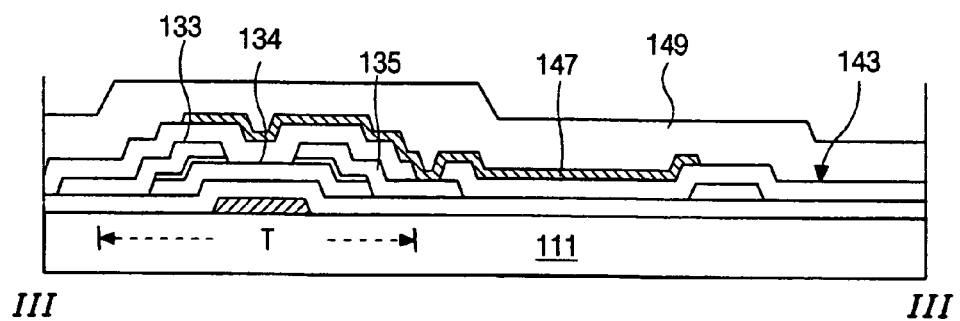

A first embodiment of the present invention will be described hereinafter with reference to FIG. 8 and FIGS. 9A to 9C. FIG. 8 is a plan view illustrating a partial array substrate for a reflective liquid crystal display device according to the first embodiment of the present invention. FIGS. 9A to 9C are cross-sectional views taken along III-III of FIG. 8 illustrating a fabricating sequence of an array substrate according to the first embodiment of the present invention. In FIG. 9A, a gate line 125 and a gate electrode 132 are formed on the substrate 111 by depositing conductive metal such as aluminum (Al), aluminum alloys, molybdenum (Mo), copper (Cu), tungsten (W) and chromium (Cr), for example, and patterning it. If the gate electrode 132 and the gate line 125 are formed of aluminum (Al), an additional conductive metal layer for protecting the gate electrode 132 and the gate line 125 may be formed. A gate insulating layer 141 is formed on the substrate 111 and on the gate electrode 132 by depositing or coating organic insulating material or inorganic insulating material. The organic insulating material for the gate insulating layer 141 is selected from a group including benzocyclobutene (BCB) and acrylic resin. The inorganic insulating material for the gate insulating layer 141 is selected from a group including silicon oxide ($SiO_2$) and silicon nitride ($SiN_x$). A semiconductor layer 134 is formed on the gate insulating layer 141 by depositing an amorphous silicon layer and impure amorphous silicon layer on the gate insulating layer 141 and patterning it. A data line 127 crossing the gate line 125, a source electrode 133 connected to the data line 127 and a drain electrode 135 being spaced apart from the source electrode 133 are formed by depositing conductive metal material on the whole area of the substrate 111 and patterning it. Though it is not shown in the figure, an align key is formed on the corner of the substrate 111 during the gate line 125 of FIG. 8 forming process or the data line 127 forming process.

In FIG. 9B, a first passivation layer 143 is formed on the substrate by depositing an inorganic insulating material such as silicon oxide ($SiO_2$) or silicon nitride ($SiN_x$) and then patterning it to form a drain contact hole 145 exposing a part of the drain electrode 135. The first passivation layer 143 is formed thin. As a result, it can be formed thin on the align key allowing an uneven shape of the align key be remained.

In FIG. 9C, a reflective electrode 147 that contacts the drain electrode 135 through the drain contact hole 145 is formed on the first passivation layer 143 by depositing and patterning a conductive metal material such as aluminum (Al) or aluminum alloys that has a low electric resistance and high reflexibility. At this time, a detection of the align key can be performed well during the depositing and etching process for the reflective electrode 147. Accordingly, a process error caused by an alignment error of the mask and the substrate does not occur during the reflective electrode forming process. A second passivation layer 149 is formed on the substrate 111 by depositing organic insulating material.

If silicon nitride ($SiN_x$) is formed beneath the reflective electrode 147, the electrical conduction property of the liquid crystal panel can be improved and contact property between the reflective electrode 147 and the first passivation layer 143 can be improved, which results in an improvement of electric properties of a liquid crystal panel.

Figure 10:
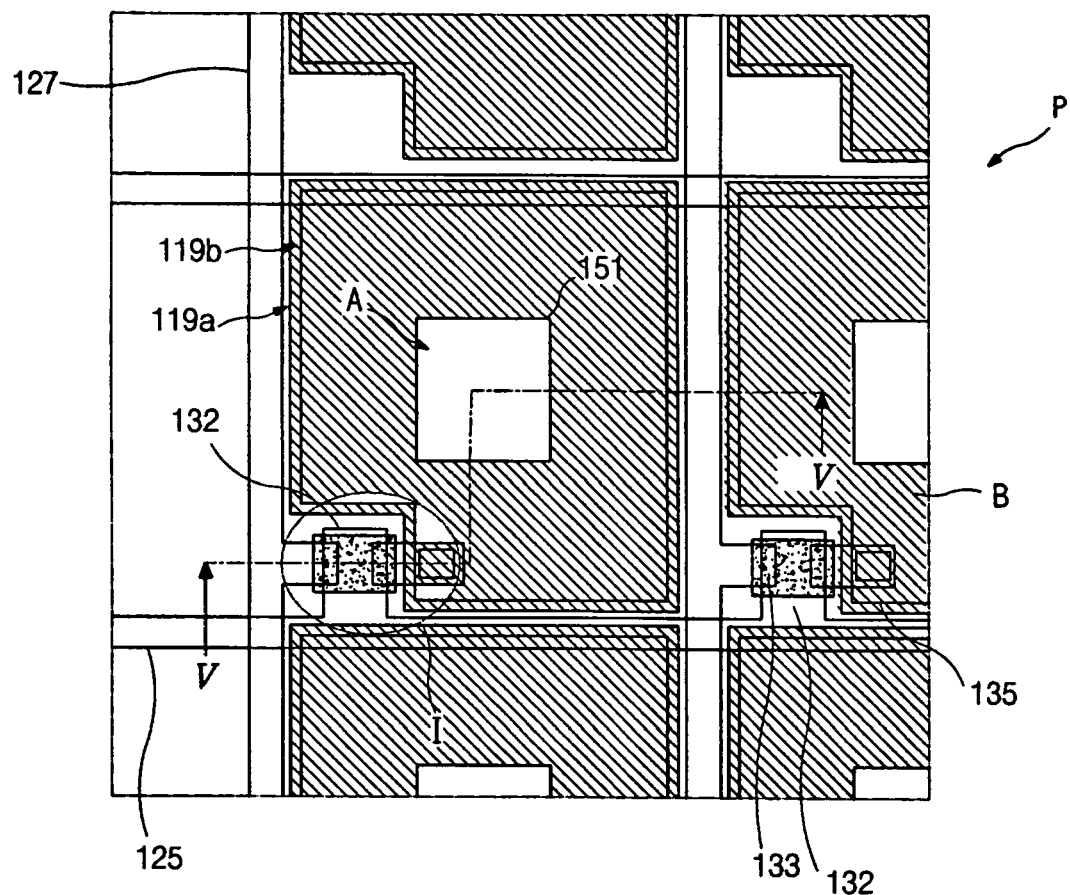
FIG. 10 is a plan view illustrating a partial array substrate having an inverted stagger type thin film transistor for a transflective liquid crystal display device according to a second embodiment of the present invention.
Figure 11A:
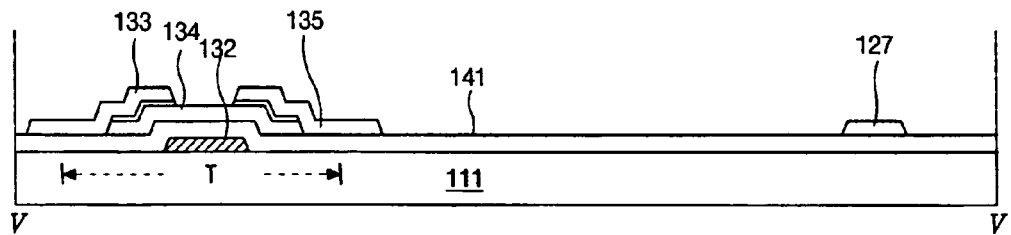
FIGS. 11A to 11E are cross-sectional views taken along line V-V of FIG. 10 illustrating a fabricating sequence of an array substrate according to the second embodiment of the present invention.

A second embodiment of the present invention will be described hereinafter with reference to FIG. 10 and FIGS. 11A to 11E. FIG. 10 is a plan view illustrating a partial array substrate having an inverted stagger type thin film transistor for a transflective liquid crystal display device according to the second embodiment of the present invention. FIGS. 11A to 11E are cross-sectional views taken along line V-V of FIG. 10 illustrating a fabricating sequence of an array substrate according to the second embodiment of the present invention. In FIG. 11A, because a thin film transistor forming process is the same as that of the first embodiment, i.e., a reflective liquid crystal display device, it will not be described in detail herein.

As shown in FIG. 11A, a gate electrode 132, a source electrode 133, a drain electrode 135, an active layer 134 and a data line 127 are formed on a substrate 111 in sequence. Though it is not shown in the Figures, an align key for accurate aligning of the mask and the substrate is formed on the corner of the substrate simultaneously with the gate line or the data line forming process. The shape of the align key is uneven. Accordingly, a detector aligns the mask and the substrate by irradiating light onto the uneven surface of the align key and sensing the light reflected from the surface of the align key.

Figure 11B:
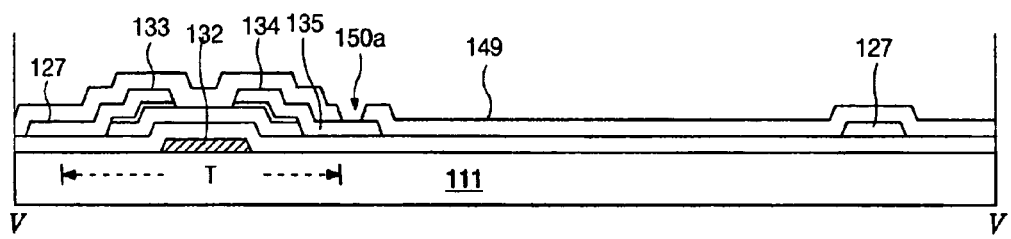

In FIG. 11B, a first passivation layer 149 is formed on the substrate 111 and on the thin film transistor "T" by depositing inorganic insulating material such as silicon nitride ($SiN_x$), for example, on the substrate 111. Because the first passivation layer 149 is formed thin on the substrate 111 compared with organic insulating material such as benzocyclobutene (BCB), for example, the uneven shape of the align key may remain. A first drain contact hole 150a for exposing a part of the drain electrode 135 is formed by patterning the first passivation layer 149.

Figure 11C:
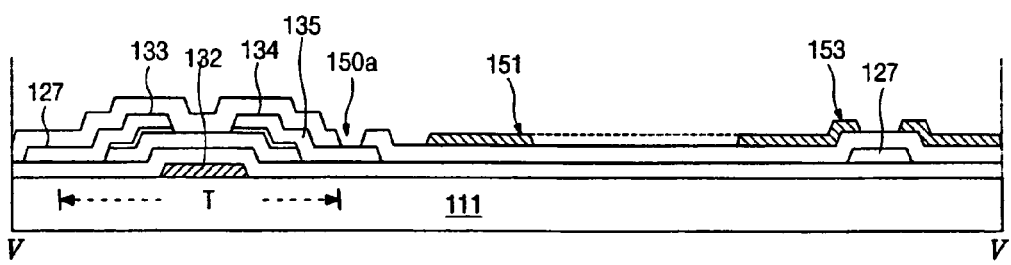

In FIG. 11C, a reflector 153 that includes a transmission hole 151 in the pixel region is formed by depositing and patterning a metal such as aluminum (Al) and aluminum alloys, for example, on the first passivation layer 149. At this time, a detection of the align key can be achieved well during the depositing and etching process for the reflector 153. Accordingly, a process error caused by an alignment error of the mask and the substrate is not occurred during the reflective electrode forming process.

Figure 11D:
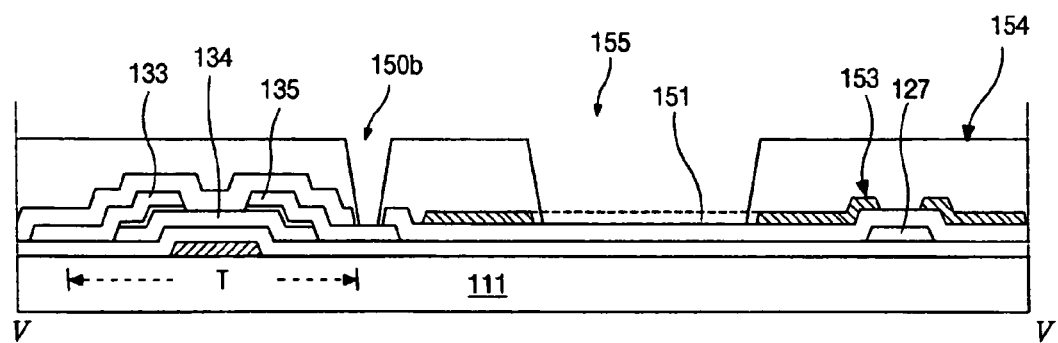

In FIG. 11D, a second passivation layer 154 is formed on the substrate 111 by depositing transparent organic insulating material such as benzocyclobutene (BCB) and acrylic resin. A second drain contact hole 150b that exposes a part of the drain electrode 135 is formed by etching the second passivation layer 154 corresponding to the first drain contact hole 150a of FIG. 11C and an etching hole 155 is formed by etching the second passivation layer 154 corresponding to the transmission hole 151. At this time, the first passivation layer 149 may be etched simultaneously with the second passivation layer 154.

Figure 11E:
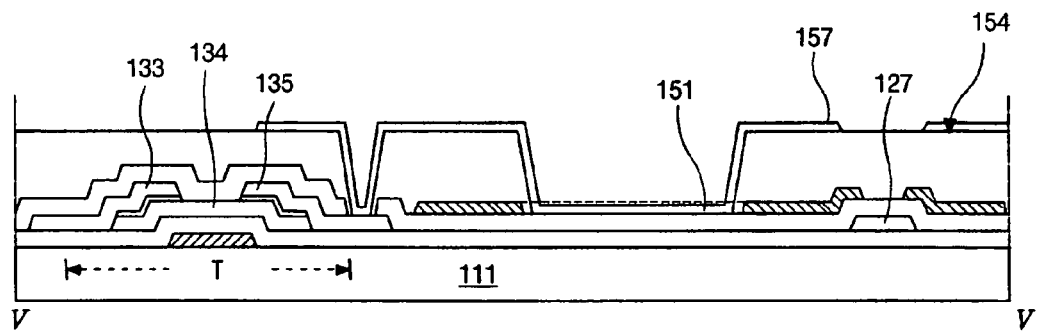

In FIG. 11E, a transparent pixel electrode 157 that contacts the drain electrode 135 through the drain contact hole is formed by depositing and patterning transparent conductive material such as indium tin oxide (ITO) or indium zinc oxide (IZO), for example, on the second passivation layer 154.

Whereas the drain electrode is exposed by etching the first passivation layer 149 and the second passivation layer 154 respectively in a different process as in FIG. 11B and FIG. 11D, the drain contact hole can be formed by etching the first passivation layer 149 and the second passivation layer 154, simultaneously in a single process.

Figure 12:
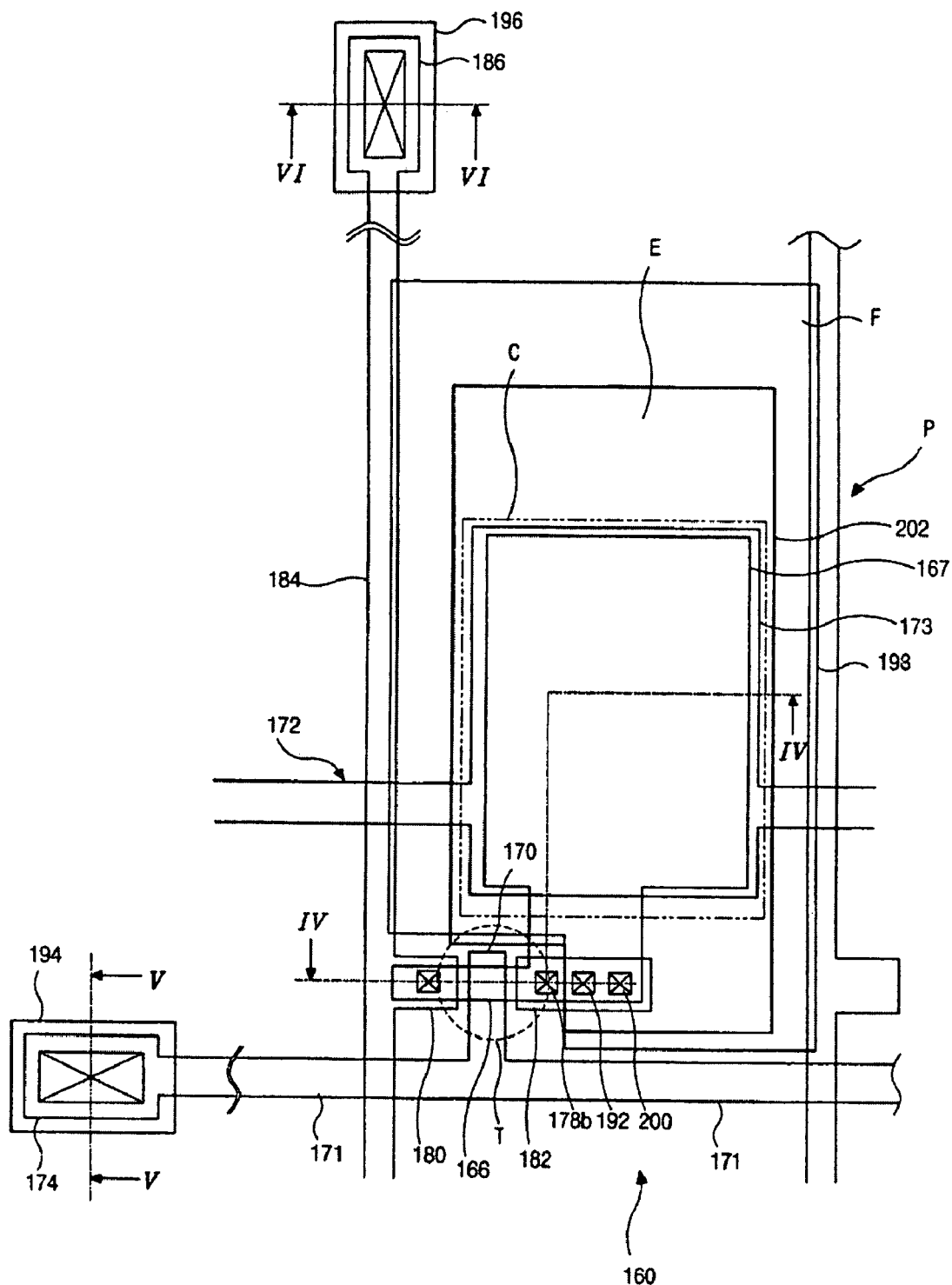
FIG. 12 is a plan view illustrating a partial array substrate having a coplanar type polysilicon thin film transistor for a transflective liquid crystal display device according to a third embodiment of the present invention.

A third embodiment of the present invention will be described hereinafter with reference to FIG. 12 and FIGS. 13A to 13F. FIG. 12 is a plan view illustrating a partial array substrate having a coplanar type polysilicon thin film transistor for a transflective liquid crystal display device according to the third embodiment of the present invention. FIGS. 13A to 13F are cross-sectional views taken along lines IV-IV, V-V and VI-VI of FIG. 12 illustrating a fabricating sequence of an array substrate according to the third embodiment of the present invention.

Figure 13A:
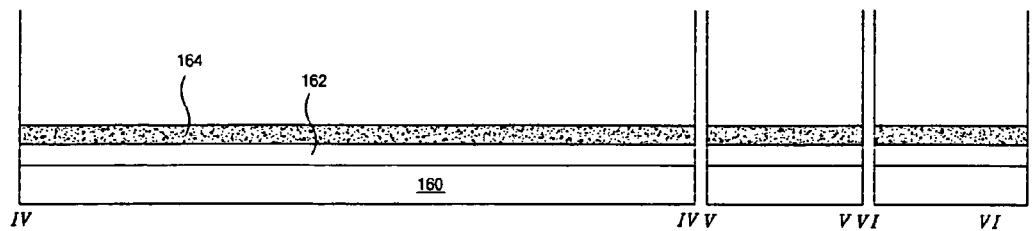
FIGS. 13A to 13F are cross-sectional views taken along lines IV-IV, V-V, VI-VI of FIG. 12 illustrating a fabricating sequence of an array substrate according to the third embodiment of the present invention.

In FIG. 13A, a first insulating layer 162, i.e., a buffer layer, is formed on the transparent insulating substrate 160 by depositing inorganic insulating material such as silicon oxide ($SiO_2$) or silicon nitride ($SiN_x$). The buffer layer 162 is optional. A polysilicon layer 164 is formed by depositing amorphous silicon (a-Si: H) on the buffer layer 162 and crystallizing the amorphous silicon.

Figure 13B:
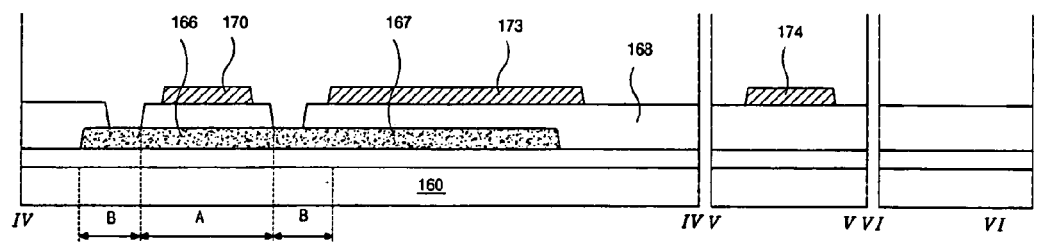

In FIG. 13B, a semi-conductor layer 166 is formed by patterning the polysilicon layer 164. The semi-conductor layer 166 has a semi-conductor layer expanded portion 167 corresponding to a pixel region "P" of FIG. 12. The semi-conductor layer 166 can be divided into a first active region "A" that serves as an active channel and a second active region "B" that is ion doped. A second insulating layer 168, i.e., a gate insulating layer, is formed on the substrate 160 and on the semi-conductor layer 166 by depositing inorganic insulating material such as silicon oxide ($SiO_2$) or silicon nitride ($SiN_x$), for example, on the substrate 160. A gate electrode 170 over the first active region "A", a gate line 171 connected to the gate electrode 170 and a gate pad 174 connected to one end of the gate line 171 are formed by depositing and patterning conductive metal material on the second insulating layer 168. A storage line 172 is simultaneously formed parallel to the gate line 171 and the storage line 171 has a storage line expanded portion 173.

Figure 13C:
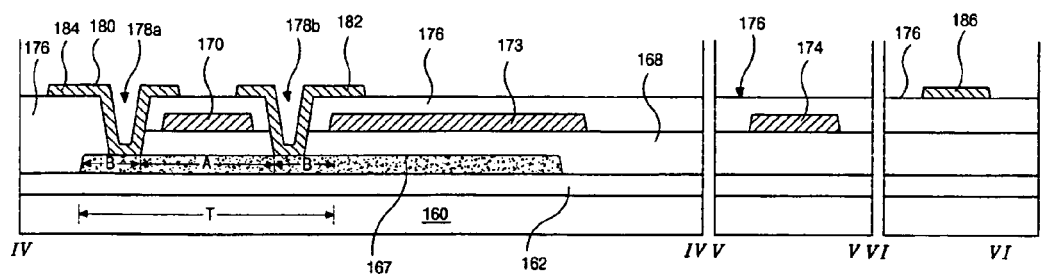

In FIG. 13C, a third insulating layer 176, i.e., interlayer insulating layer, is formed by depositing insulating material on the whole area of the substrate 160. A first contact hole 178a and a second contact hole 178b, which expose the second active region "B" of the semi-conductor layer 167 are formed. A source electrode 180 and a drain electrode 182, which contact the exposed second active region "B" are formed by depositing and patterning conductive metal such as aluminum (Al), aluminum alloys, chromium (Cr), tungsten (W), molybdenum (Mo) and niobium (Nb), for example, on the third insulating layer 176. A data line 184, which is connected to the source electrode 180 and vertically extended form the source electrode 180 is formed on the third insulating layer 176. A data pad is formed at one end of the data line 184. The data line 184 defines a pixel region "P" by crossing the gate line 171. A polysilicon thin film transistor is formed through the above processes.

Figure 13D:
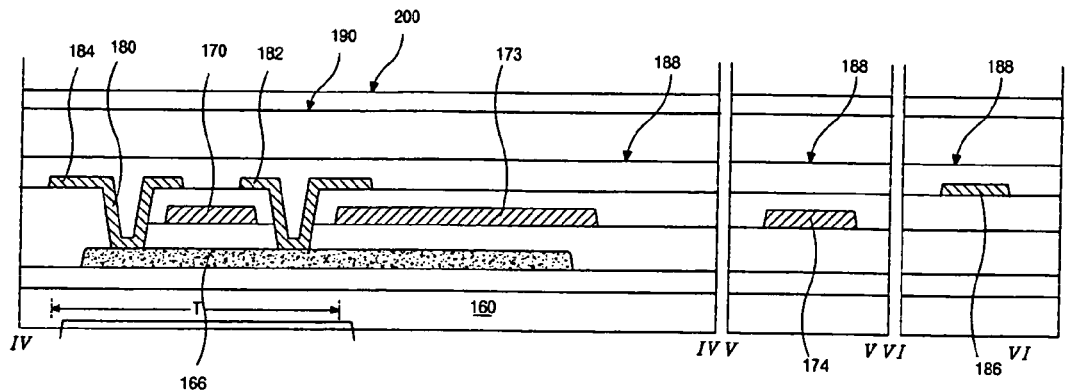

In FIG. 13D, a fourth insulating layer 188 is formed by depositing inorganic insulating material such as silicon oxide ($SiO_2$) or silicon nitride ($SiN_x$), for example, on the substrate 160. The thin film transistor then undergoes a hydrogenation process. The hydrogenation process is for removing defects occurred on the surface of the active layer 166 and the fourth insulating layer 188 may be formed of silicon nitride ($SiN_x$) that includes hydrogen. A fifth insulating layer 190 is formed by depositing transparent organic insulating material such as benzocyclobutene (BCB) or acrylic resin, for example, on the fourth insulating layer 188. A sixth insulating layer 200, i.e., a barrier layer, is formed by depositing inorganic insulating material such as silicon oxide ($SiO_2$) or silicon nitride ($SiN_x$), for example, on the fifth insulating layer 190.

Figure 13E:
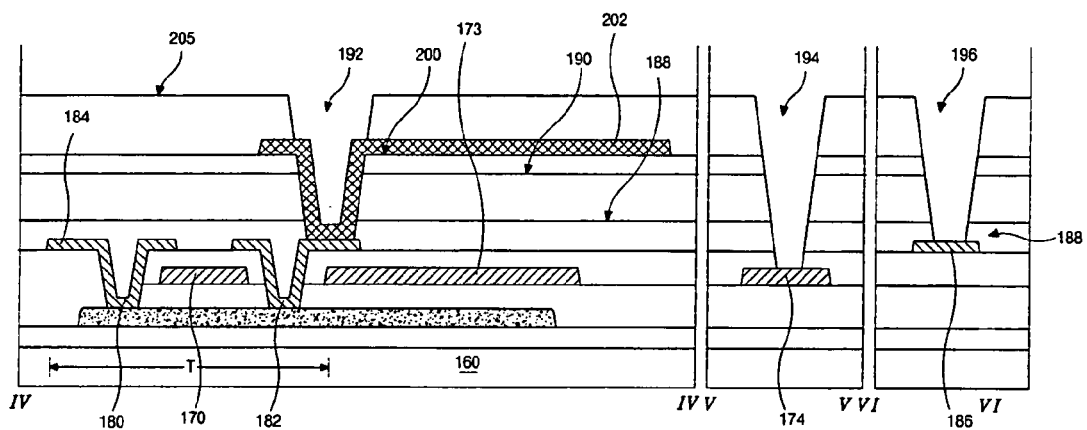

In FIG. 13E, a reflector 202 is formed in the pixel region "P" by depositing and patterning conductive metal material such as aluminum (Al) or aluminum alloys, for example, on the barrier layer 200. As shown in the figure, the reflector 202 is formed over the storage line expanded portion 173. However, the reflector 202 may be formed over the thin film transistor and extended to cover the gate line 171 and the data line 184. The reflector and the storage line expansion portion 173 constitute a reflection portion "E" of FIG. 12 in the pixel region "P" of FIG. 12 and the remaining portion of the pixel region "P" of FIG. 12 is a transmission portion "F" of FIG. 12. Accordingly, an area ratio between the reflection portion and the transmission portion can be controlled by varying the reflector 202 and the storage line expansion portion 173. A seventh insulating layer 205 is formed by depositing inorganic insulating material such as silicon oxide ($SiO_2$) or silicon nitride ($SiN_x$), for example, on the substrate 130 and on the reflector 202. A drain contact hole 192 that exposes a part of the drain electrode 182 is formed by etching the fourth insulating layer 188, the fifth insulating layer 190, the sixth insulating layer 200, i.e., the barrier layer and the seventh insulating layer 205 over the drain electrode 182. A gate pad contact hole 194 that exposes the gate pad 174 is formed by etching laminated insulating layers from the third insulating layer 176 to the seventh insulating layer 205 over the gate pad 174. A data pad contact hole 196 that exposes the data pad is formed by etching laminated layers from the fourth insulating layer 188 to the seventh insulating layer 205 over the data pad 186.

An under-cut and an inversed taper, which occurs in the wall of the plurality of the contact holes can be prevented by equalizing an etching speed of the transparent organic insulating layers with the etching speed of the plurality of inorganic insulating layers. The equalizing of the etching speeds of the laminated layers is performed by adding about 65~80% of oxygen gas to etching gas ($SF_6$, $CF_4$).

Figure 13F:
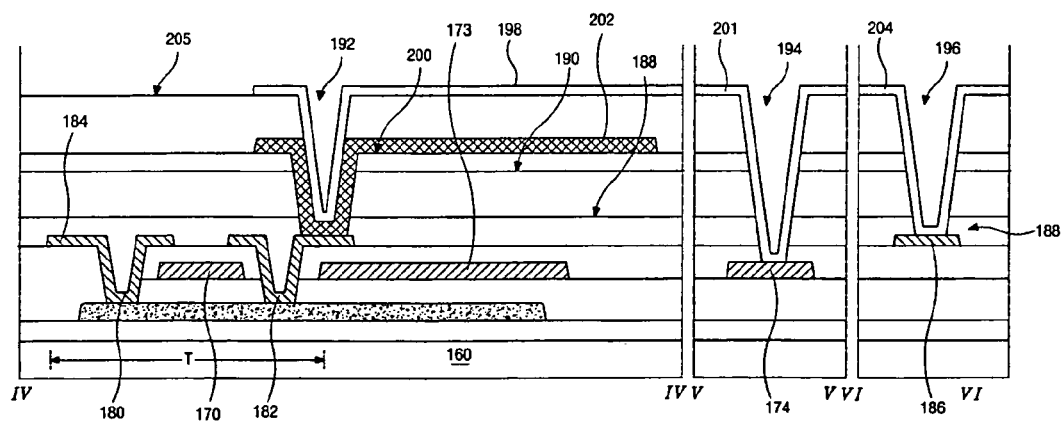

In FIG. 13F, a pixel electrode 198 contacts the exposed drain electrode 182 through the drain contact hole 192. A gate pad terminal 201 contacts the gate pad 174 through the gate pad contact hole 194. A data pad terminal 204 contacts the data pad 186 through the data pad contact hole 196. The pixel electrode 198, gate pad terminal 201 and data pad terminal 204 are formed by depositing and patterning transparent conductive metal material such as indium tin oxide (ITO) or indium zinc oxide (IZO), for example, on the seventh insulating layer 205 and in the respective contact holes 192, 194 and 196.

The transflective liquid crystal display device of the present invention having a high aperture ratio can be manufactured through the manufacturing process described above.

As described above, an array substrate for reflective and transflective liquid crystal display devices includes a reflective electrode that avoids being formed directly on an organic insulating layer such as benzocyclobutene (BCB) by exchanging a forming order of the organic insulating layer and an inorganic insulating layer such as silicon nitride ($SiN_x$) or by introducing a barrier layer between the organic insulating layer and the reflective electrode. Accordingly, the array substrate with reflective electrode formed in this matter avoids the problems of the conventional art discussed above.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An array substrate for a transflective liquid crystal display device, the substrate comprising;
   a thin film transistor including an active layer, a gate electrode and source and drain electrodes, formed sequentially on a substrate;
   a gate line including connected to the gate electrode;
   a gate pad at a first end of the gate line;
   a storage line parallel to the gate line and spaced apart from the gate line;
   a data line defining a pixel region by crossing the gate line, the data line being connected to the source electrode, wherein the pixel region is divided into a reflection area and a transmission area;
   a data pad at one end of the data line;
   an organic insulating layer over the thin film transistor and the data line;
   a barrier layer on the organic insulating layer, the barrier layer being formed of an inorganic insulating material;
   a reflector on the barrier layer, the reflector being located in the reflection area;
   an inorganic insulating layer on the reflector; and
   a transparent pixel electrode on the inorganic insulating layer, the pixel electrode contacting the drain electrode, wherein the pixel electrode is located in the reflection area and the transmission area.

2. The substrate according to claim 1, further comprising:
   an insulating layer beneath the organic insulating layer for performing a hydrogenation process of the thin film transistor.

3. The substrate according to claim 1, further comprising:
   a buffer layer beneath the active layer, the buffer layer including an inorganic insulating material such as silicon oxide ($SiO_2$) or silicon nitride ($SiN_x$).

4. The substrate according to claim 1, wherein the active layer is formed of polysilicon.

5. The substrate according to claim 1, wherein the storage line and gate line are formed of a same material and on a same layer.

6. The substrate according to claim 1, wherein the reflector is formed of a conductive metal material including aluminum (Al) or aluminum alloys.

7. The substrate according to claim 1, wherein the pixel electrode is formed of a transparent conductive material including indium tin oxide (ITO) or indium zinc oxide (IZO).

8. The substrate according to claim 1, wherein the reflector extends to the data line and covers the thin film transistor.

9. The substrate according to claim 1, wherein the reflector is partially overlapped with the gate line or the data line.

10. The substrate according to claim 1, wherein the reflector covers the thin film transistor.

11. The substrate according to claim 1, wherein the barrier layer is formed using inorganic insulating material including silicon oxide ($SiO_2$) or silicon nitride ($SiN_x$), for example.

12. A method of forming an array substrate for a transflective liquid crystal display device, the method comprising the steps of:
   forming a thin film transistor including a substrate and sequentially forming an active layer, a first insulating layer, a gate electrode, a second insulating layer and source and drain electrodes on the substrate;
   forming a gate line and a storage line, the storage line being formed parallel to the gate line and being spaced apart from the gate line;
   forming a gate pad at a first end of the gate line;
   forming a data line defining a pixel region by crossing the gate line, the data line being connected to the source electrode, wherein the pixel region is divided into a reflection area and a transmission area;
   forming a data pad at a first end of the data line;
   forming a third insulating layer over the thin film transistor and the data line, the third insulating layer being formed of transparent organic insulating material;
   forming a fourth insulating layer on the third insulating layer, the fourth insulating layer being a barrier layer and being formed of inorganic insulating material;
   forming a reflector on the barrier layer, being located in the reflection area;
   forming a drain contact hole over the drain electrode by depositing and patterning a fifth insulating layer on the reflector;
   forming an inorganic insulating layer between the reflector; and
   forming a transparent pixel electrode on the inorganic insulating layer, the pixel electrode contacting the drain electrode, wherein the pixel electrode being located in the reflection area and the transmission area.

13. The method according to claim 12, further comprising:
   forming an insulating layer beneath the organic insulating layer to perform a hydrogenation process of the thin film transistor.

14. The method according to claim 12, further comprising:
   forming a buffer layer beneath the active layer using an inorganic insulating material including silicon oxide ($SiO_2$) or silicon nitride ($SiN_x$).

15. The method according to claim 12, wherein the active layer is formed of polysilicon.

16. The method according to claim 12, wherein the storage line and gate line are formed with a same material and on a same layer.

17. The method according to claim 12, wherein the reflector is formed of a conductive metal material including aluminum (Al) or an aluminum alloy.

18. The method according to claim 12, wherein the pixel electrode is formed of transparent conductive material including indium tin oxide (ITO) or indium zinc oxide (IZO).

19. The method according to claim 12, wherein the reflector is extended to the data line and covers the thin film transistor.

20. The method according to claim 12, wherein the reflector is partially overlapped with the gate line or the data line.

21. The method according to claim 12, wherein the reflector covers the thin film transistor.

22. The method according to claim 12, wherein the barrier layer is formed using an inorganic insulating material including silicon oxide ($SiO_2$) or silicon nitride ($SiN_x$).

23. The method according to claim 12, wherein the drain contact hole is formed by etching the third insulating layer, the fourth insulating layer and the fifth insulating layer simultaneously with an etching gas including about 65-80% of oxygen gas.

* * * * *